Mar. 20, 1923.
M. E. BURNETT
1,448,827
GUIDE FOR USE IN SEWING
Filed Aug. 10, 1921
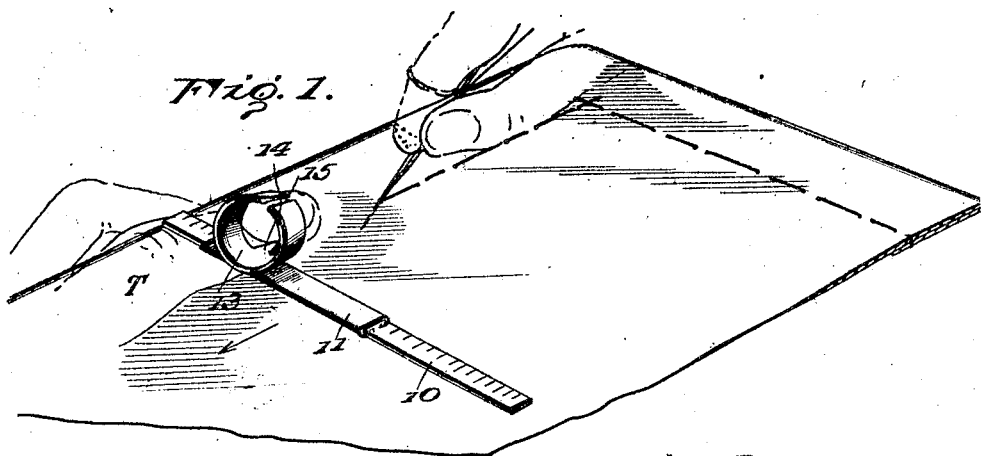
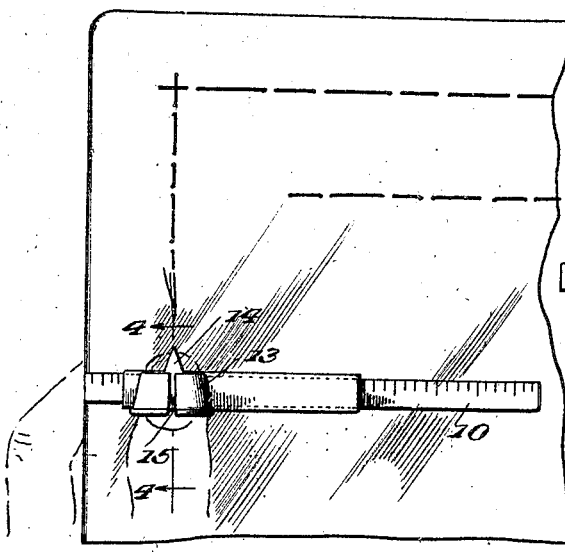
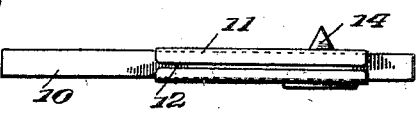
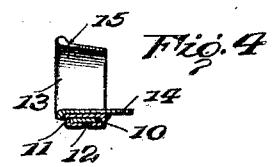
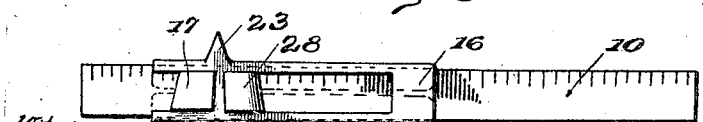
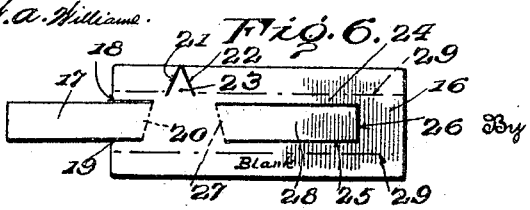
Inventor
Mary E. Burnett.

Patented Mar. 20, 1923.

1,448,827

UNITED STATES PATENT OFFICE.

MARY E. BURNETT, OF McLEAN, VIRGINIA.

GUIDE FOR USE IN SEWING.

Application filed August 10, 1921. Serial No. 491,145.

*To all whom it may concern:*

Be it known that I, MARY E. BURNETT, a citizen of the United States, and a resident of McLean, in the county of Fairfax and State of Virginia, have invented certain new and useful Improvements in Guides for Use in Sewing, of which the following is a specification.

My invention relates to devices used in sewing and has reference more particularly to gages and guides and has for an object to provide an extremely simple and efficient instrument by which the width of a hem may be readily gaged and indicated.

Another object is to provide an instrument by which lines of ornamental stitching may be accurately applied to fabrics.

Another object is to provide means by which hems of any desired width may be indicated and followed with ease, the indicator being movable and frictionally held on a scale measure or bar so as to indicate in inches the width of the hem or the like.

With these and other objects in view my invention consists in certain novel features of construction, arrangement and combination of parts as will be hereinafter fully described and pointed out in the claims, reference being had to the accompanying drawings forming a part hereof, in which—

Figure 1 is a perspective view showing the invention in use.

Figure 2 is a plan view of same.

Figure 3 is an inverted plan view of the device.

Figure 4 is a vertical section taken on line 4—4 of Figure 2.

Figure 5 is a top plan view of a modified construction.

Figure 6 is a plan view of the blank from which the slidable member shown in Figure 5 is made.

In carrying my invention into effect a scale bar 10 is used provided with the usual graduations and upon this is mounted slide 11 which in the form illustrated in Figures 1–4 consists of a flattened tube having the slit 12 permitting it to be expanded so that it may be slid upon the scale bar 10; the slit also permits the tube which has a certain amount of resiliency and elasticity to contract when left on the bar and thus frictionally holds the slide and the bar together.

The tubular slide 11 is somewhat elongated and adjacent one end on elastic thumb holder or stall 13 is rigidly secured to it either by soldering or riveting. The thumb stall is in reality a split ring having slit 15, and approximates in shape a truncated cone, and is of slightly greater width than the slide and the scale bar; it is given this form so that the thumb may be readily slipped into the split ring which by its elasticity holds the entire device on the thumb or finger. Projecting axially from the edge of the smaller end of the split thumb piece is a pointer 14 which is shaped like a triangular tooth and it is positioned diametrically opposite the slit 15 in the thumb piece, and projects transversely a suitable distance beyond one edge of the tubular slide. This pointer 14 may be made integral with the split ring or rigidly secured to it in any suitable way.

In Figures 5 and 6 I have illustrated the device made from a single blank of sheet metal and in this way save material and labor involved in assembling the various parts.

In this modification I utilize an oblong plate 16 which has an elongated tongue 17 projecting from one end, the plate being slitted inwardly as at 18 and 19 at the edges of the tongue; these slits are of unequal length so that when the tongue 17 is rolled into a ring like form its junction with the plate is obliquely across the plate as shown at 20 and the ring part assumes the cone-shape which is characteristic of the thumb stall 13 Fig. 1. Adjacent the end of the plate and at one edge I make the slits 21 and 22, which meet at the edge of the plate, leaving a triangular tongue 23.

Within the body portion of the plate I make the longitudinal slits 24 and 25, and the transverse or cross slit 26 joining the ends of slits 24 and 25 at a right angle.

The slit 24 is of greater length than slit 25 so that an oblique line 27 is left and on this is rolled the tongue 28 completing the truncated cone shaped split ring or thumb stall.

The plate 16 is folded over on the dotted lines 29 and forms a flattened tubular slide corresponding to the member 11 of Figures 1–4. But by cutting and rolling out the tongues 17 and 28 the graduations on the scale bar are visible through the slide.

To use the device for making a hem as indicated in Figure 1 the thumb, usually of the left hand, as indicated by the letter T is slipped into the split ring 13, the hem folded over to the desired width, and the slide moved to the desired width so that the pointer is at, and indicates the line for the stitching, and the hemming then carried out to its completion.

The device can be very well used also for applying to fabrics a popular style of hem stitch ornamentation known as "long and short stitch" which is indicated in Figures 1 and 2 by the various broken lines.

The device illustrated in Figures 5 and 6 is used in the same manner as the form shown in the preceding figures and it will be observed the pointer may be used as a marker.

From the above it will be seen that I provide an extremely simple, cheap and efficient instrument that will form an important addition to the art of sewing.

I claim—

1. In a device as herein characterized a graduate scale, a movable finger stall longitudinally slidable on the upper face thereof, and a pointer projecting from said finger stall.

2. In a device of the character described, a graduated scale measure, a finger stall disposed transversely of the scale measure, said finger stall movable longitudinally of the scale measure on its upper face and frictionally held thereon.

3. In a device of the character described, an expansible tubular finger stall, a scale bar, a pointer extending longitudinally from the finger stall, said finger stall frictionally held to the scale bar and slidable longitudinally above said scale bar.

4. In a device of the character described a flat scale measure, a flat tubular slide mounted thereon, a tubular finger stall rigidly mounted on said slide, and disposed transversely of the slide, and a pointer extending longitudinally of the tubular finger stall.

5. In a device of the character described, a scale bar, a tubular slide mounted thereon, said slide being provided with bent tongues formed into a resilient finger stall, and a pointer projecting laterally from the slide.

6. A blank for the slide as set forth in claim 5 and comprising a flat plate having oppositely extending tongues cut from the plate and bent on convergent transverse lines to form a truncated cone shaped open ring, a triangular tongue cut into one edge of said plate, and bent under flanges along the opposite longitudinal sides of the plate to form the same into a tubular slide adapted to be frictionally held on the scale bar.

MARY E. BURNETT.